April 4, 1939.    C. J. CRANE ET AL    2,152,635
AIRCRAFT SPEED INDICATOR
Filed May 26, 1936    3 Sheets-Sheet 1

Carl J. Crane
FRANCIS G. NESBITT
INVENTORS.
BY
ATTORNEYS

April 4, 1939.  C. J. CRANE ET AL  2,152,635

AIRCRAFT SPEED INDICATOR

Filed May 26, 1936  3 Sheets-Sheet 2

Carl J. Crane
Francis G. Nesbitt
INVENTORS.
ATTORNEYS

April 4, 1939.　　　C. J. CRANE ET AL　　　2,152,635
AIRCRAFT SPEED INDICATOR
Filed May 26, 1936　　　3 Sheets-Sheet 3

Carl J. Crane
Francis G. Nesbitt
INVENTORS.
BY
ATTORNEYS

Patented Apr. 4, 1939

2,152,635

UNITED STATES PATENT OFFICE 2,152,635

AIRCRAFT SPEED INDICATOR

Carl J. Crane, Fairfield, and Francis G. Nesbitt, Dayton, Ohio

Application May 26, 1936, Serial No. 81,870

27 Claims. (Cl. 73—151)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to aircraft instruments and more particularly to a combined horizontal air speed and vertical air speed (rate of climb) indicator and to means for adjusting the indicator for a predetermined condition of flight of an aircraft.

One of the objects of the invention is to provide a novel and compact aircraft speed indicator which indicates the longitudinal or horizontal speed of an aircraft obtained by measuring the differential of the Pitot or impact pressure and the static pressure produced by a Pitot-static tube, and which also indicates the vertical speed or rate of climb of the aircraft obtained by measuring the rate of change of the same static pressure, the latter pressure being the altitude or barometric pressure.

Another object of the invention is to provide a novel combination of elements for indicating both components, horizontal and vertical, of the speed of an aircraft on one instrument of a standard size whereby two instruments usually provided for this purpose are replaced by a single instrument, thus greatly facilitating instrument flying.

Another object is to provide, in an instrument of the class described, novel means for adjusting the dial and pointer means of the horizontal or air speed indicating portion of the instrument so that for any desired normal cruising speed the pointer and the number on the scale representing the cruising speed are brought to a horizontal position with the pointer pointing to the left as viewed from the front of the instrument shown in the present embodiment whereby said pointer moves upward when the air speed decreases below the cruising speed, as in climbing, and moves downward when the air speed increases, as in diving.

Another object of the invention is to provide a novel instrument of the above type in which the air speed pointer and the vertical speed or rate of climb pointer are arranged in vertical planes spaced one behind the other and concentrically mounted for rotation about a common axis and in which the zero of the vertical speed or rate of climb dial or scale and the pointer thereof are normally horizontal with the pointer pointing to the right when the aircraft is in level flight and moving upward or downward when the aircraft is climbing or diving, and novel means for adjusting the dial and pointer of the air speed indicating portion of the instrument so that for any desired cruising speed the pointer and the number on the scale representing the cruising speed are brought to a horizontal position with the pointer pointing toward the left as viewed from the front of the instrument whereby said pointer moves upward when the air speed decreases below the cruising speed, as in climbing, and moves downward when the air speed increases, as in diving, and whereby the two pointers form, in effect, a single "hinged" indicator, the arms of the "hinged" indicator being pivoted at the center of the face of the instrument and forming an unbroken horizontal line across the face of the instrument when the aircraft on which the instrument is mounted is in level flight and flying at the desired cruising speed for which the instrument was set, but when the aircraft starts climbing the "hinged" indicator will form an upright V and when the aircraft starts diving the indicator will form an inverted V.

Another object of the invention is to provide in an air speed indicator, whether combined with a vertical speed indicator or not, novel means for adjusting the dial and pointer to bring the pointer to a horizontal position for a desired cruising speed without moving the diaphragm which actuates the pointer, whereby leaks are eliminated in the instrument which must be air-tight, thereby greatly increasing the dependability of the instrument.

Another object of the invention is to provide a novel indicating instrument having a pair of concentrically pivoted pointers for respectively indicating two factors contributing to the maintenance of a desired condition, and means whereby said pointers may be set so that they form a straight line diametrically across the face of the instrument for a desired reading of said pointers when the desired condition is maintained.

Another object is to provide in an air speed indicator having a dial, a pointer, a diaphragm and mechanism for operating the pointer upon expansion and contraction of the diaphragm, novel means including a knob and planetary gearing actuated thereby for rotating said dial and pointer simultaneously and synchronously to bring the pointer to a horizontal position for a desired cruising speed indicated on the dial by said pointer in its horizontal position, without rotating or in any way moving the diaphragm which is rigidly mounted in the instrument casing.

Still another object of the invention is to provide, broadly, in any indicating instrument having a dial, a pointer and means responsive to changes in conditions or operations for operating the pointer, novel means for rotating the dial and pointer simultaneously and synchronously to bring the pointer to a desired position for a desired condition or operation indicated on the dial by the pointer in said desired position, without rotating or in any way moving the condition responsive means.

A further object is to provide, in a novel combined air speed and rate of climb indicator having a dial and pointer for indicating air speed and a second dial and pointer concentric with the first dial and pointer for indicating rate of climb, single means for alternately adjusting the rate of climb pointer to zero and rotating the air speed dial and pointer to bring the latter to a horizontal position for a desired cruising speed.

A still further object of the invention is to provide in an instrument of the class described, remote control means for setting the instrument for a desired cruising speed from a remote point and for indicating the setting at the remote point whereby, when an aircraft is manned by a pilot and a navigator or bomber in separate cockpits or compartments, the navigator or bomber may, from his compartment or cockpit, set the instrument which is located on the pilot's instrument panel to direct the pilot to maintain the cruising speed for which the navigator or bomber has set the instrument.

The foregoing and other objects and advantages of the invention appear more fully hereinafter from a consideration of the detailed description which follows, taken together with the accompanying drawings wherein one embodiment of the invention is illustrated. It is to be expressly understood, however, that the drawings are for the purpose of illustration only and are not to be construed as defining the limits of the invention, reference being had for this purpose to the appended claims.

The invention consists substantially in the construction, combination, location and relative arrangement of parts for obtaining the results desired in accordance with the foregoing objects, as will be more fully hereinafter set forth in the specification, as shown in the drawings by way of example, and as finally pointed out in the claims.

In the drawings wherein like reference characters refer to like parts in the related views.

As indicated by the hereinbefore stated objects the invention embodies, among other things, two adjustments in an instrument of the class described by means of a single adjusting knob. One adjustment is for setting the vertical speed or rate of climb pointer to zero position, which is horizontal, in the event the pointer does not indicate zero correctly. The other adjustment is for setting the horizontal speed pointer to a horizontal position for any desired normal cruising speed so that said pointer moves upward when the air speed decreases below the cruising speed and moves downward when the air speed increases below said cruising speed.

Heretofore, a structure has been provided for setting indicating instruments and more particularly aircraft instruments to bring their pointers to a horizontal position for a given condition of flight by rotating the complete instrument mechanism in its casing, as disclosed for example in Reissue Patent No. 19,709 to J. D. Peace, Jr., dated September 17, 1935 (original Patent No. 1,812,549, dated June 30, 1931). Such a structure has been satisfactory and its use has been widely adopted but in certain types of instruments it was found disadvantageous to rotate the entire mechanism for the reason that the sensitive element of the instrument would change its operating characteristics somewhat when rotated to different positions. Accordingly, there is provided by the present invention a novel mechanism for the purpose mentioned whereby only the dial and pointer of the instrument are rotated simultaneously and synchronously without rotating the sensitive element thereof, this being accomplished, in the embodiment illustrated and described herein, by means of a planetary gear train actuated by a knob from the front of the instrument.

Referring to the drawings and more particularly to Figs. 4 to 8, inclusive, the instrument embodying the present invention comprises, in the form shown, a cup-shaped instrument casing 9 of some suitable lightweight material such as "Bakelite", for example. The casing is provided with the usual lugs or ears 10 (Figs. 1 and 8) for mounting the instrument on an instrument panel (not shown).

Figure 4:
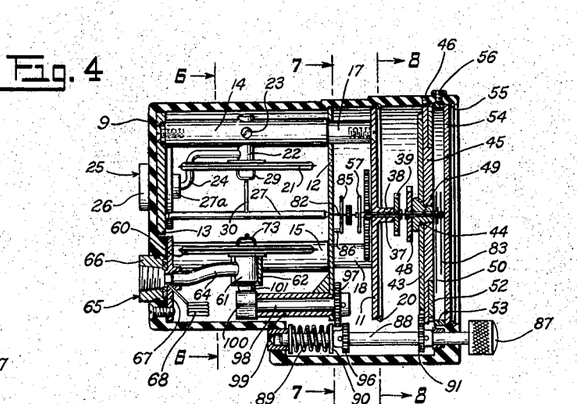
Fig. 4 is a longitudinal vertical section taken on line 4—4 of Fig. 1.
Figure 5:
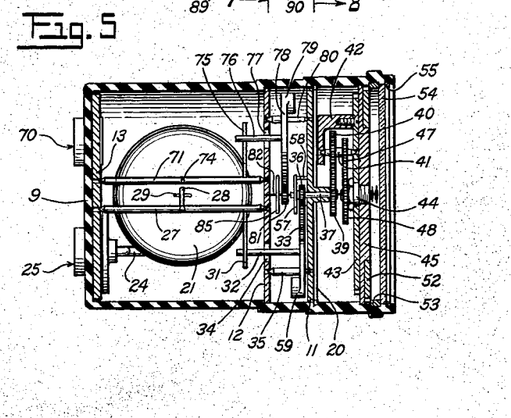
Fig. 5 is a longitudinal horizontal section taken on line 5—5 of Fig. 1.
Figures 6, 7, 8:
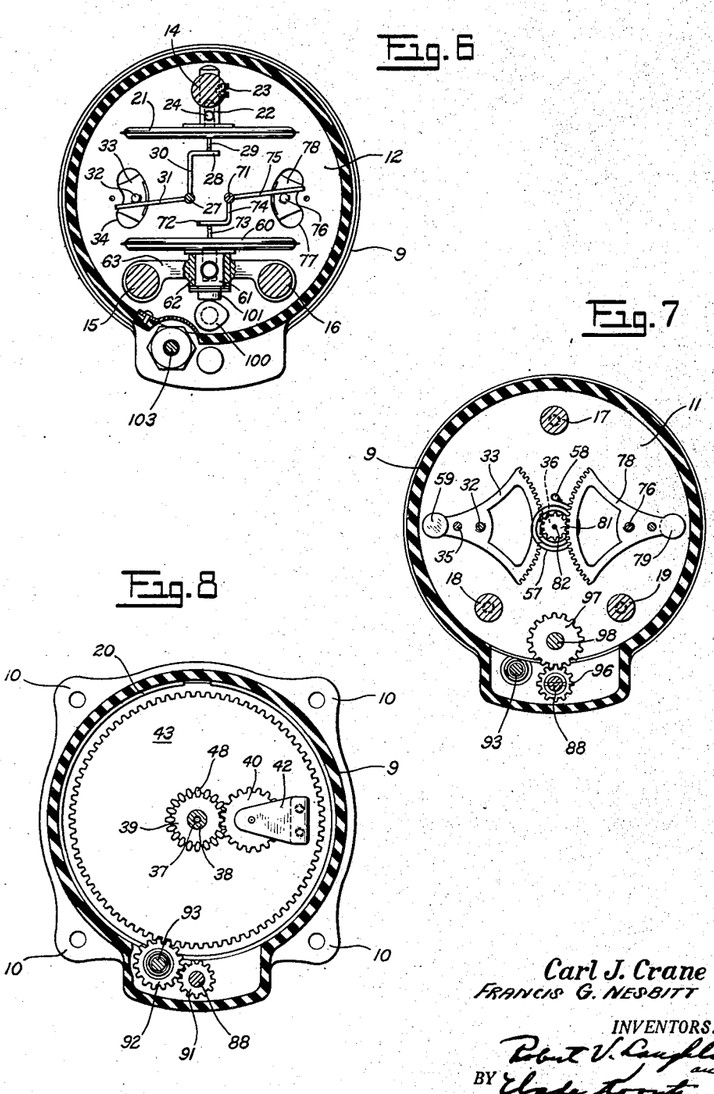
Fig. 6 is a transverse section taken on line 6—6 of Fig. 4.
Fig. 7 is another transverse section taken on line 7—7 of Fig. 4.
Fig. 8 is still another transverse section taken on line 8—8 of Fig. 4.

The instrument mechanism assembly is constructed for ready insertion and removal as a unit into and out of the casing and comprises a frame constituted by three substantially parallel plate members 11, 12 and 13 spaced apart and secured together by means of a plurality of standards or spacing rods 14, 15 and 16 (Figs. 4 and 6) having reduced portions 17, 18 and 19 (Figs. 4 and 7). The plate 13 is secured to the ends of the standards 14, 15 and 16 and the plate 12 is secured to the opposite ends of said standards at the point where the reduced portions 17, 18 and 19 begin, while the plate 11 is secured to the ends of said reduced portions 17, 18 and 19 (Fig. 4). This assembly is held in place by means of a snap ring 20 (Figs. 4 and 5).

On the standard or spacing rod 14 is adjustably mounted a pressure-responsive diaphragm 21 in any suitable manner as by means of a post 22 which extends through said rod 14 and is held therein by means of a set screw 23, the operating axis of said diaphragm 21 being at right angles to the standard 14. The position of the diaphragm 21 with respect to the standard 14 may be adjusted by means of set screw 23. The diaphragm 21 is arranged for response to velocity pressures which are proportional to the air speed of the craft on which the instrument is adapted to be mounted and for this purpose the interior of said diaphragm 21 is arranged to be connected to the velocity pressure portion of a Pitot-static tube (not shown) by means of a conduit 24 which terminates in a coupling member 25 which extends through the rear wall of the casing 9 and has a portion 26 exteriorly of the casing 9 and a portion 27a inside of the casing.

Motion of the diaphragm 21, due to expansion and contraction thereof, is transmitted to a rock shaft 27 by means of a crank having one arm 28 slidably engaging a U-shaped member 29 on the diaphragm 21 and the other arm 30 being rigidly connected to the rock shaft 27 (Fig. 6). The rock shaft 27 is journaled in the plates 12 and 13 as shown in Fig. 4. Rigidly secured to the rock shaft 27 and at an angle thereto is a lever 31 which is arranged to slidably engage a pin 32 carried by a gear sector 33 which is located on the opposite side of the plate 12, the pin 32 projecting through an opening 34 provided in said plate 12.

The gear sector is carried by a shaft 35 (Fig. 5) journaled in the plates 11 and 12 and is arranged to mesh with a pinion 36 carried on a hollow shaft 37 which projects through the plate 11, the latter being provided with a hub portion 38 for supporting said shaft 37. On the other end of the shaft 37 there is provided a gear 39 which meshes with another gear 40 carried by a stub shaft 41 one end of which is journaled in an angle bracket 42 carried by a rotatable gear plate 43 and the other end of which is journaled in said gear plate 43 (Fig. 5), said gear plate 43 being journaled on a bushing 44 secured to fixed plate 45 which is held stationary in the casing 9 by means of a threaded pin 46 (Fig. 4). Carried by and secured to the stub shaft 41 is a pinion 47 which meshes with a gear 48 secured to a hollow shaft 49 which extends through the bushing 44 and on which is carried a pointer 50.

The pointer 50 cooperates with a scale 51 (Fig. 1) to indicate air speed. The scale 51 is inscribed on a rotatable dial ring 52 (Figs. 4 and 5) journaled on the fixed plate 45 and held on said fixed plate by means of a spacing ring 53 which also forms a bearing surface for said dial ring 52. The front of the casing is closed by means of a cover glass 54 through which the pointer 50 and its cooperating scale 51 are visible, the cover glass being held in place by means of a snap ring 55. The spacing ring 53 is prevented from rotating by means of a threaded pin 56 (Fig. 4). A hair spring 57 is provided for taking up the back lash in the gear train between pinion 36 and the gear 48, one end of said hair spring being connected to the hollow shaft 37 and the other end to a pin 58 carried by the fixed plate 11.

It will be seen that as the diaphragm 21 expands and contracts upon changes in air speed its movement is transmitted to the rock shaft 27 which in turn actuates the gear sector 33 and then the pointer 50 through the gear train 36, 39, 40, 47 and 48. The gear sector 33 is provided with a counterweight 59. The structure thus far described constitutes the air speed indicator portion of the instrument.

The rate-of-climb or vertical-speed indicating portion of the instrument comprises a pressure-responsive diaphragm 60 (Figs. 4 and 6) which is mounted on a post 61 slidably extending through a tubular member 62 secured to or formed integrally with a bracket 63 the ends of which are secured to the standards or spacing rods 15 and 16 (Fig. 6). The inside of the diaphragm 60 is arranged for connection to a heat insulated tank (not shown) forming part of a standard rate of climb instrument by means of a conduit 64 which terminates in a coupling member 65 having a portion 66 outside of the casing and a portion 67 inside of the casing. At the point where conduit 64 terminates in the coupling device 65 there is provided a capillary tube 68 through which the pressures inside and outside of the diaphragm 60 tend to equalize in the usual manner when a change of altitude takes place, the free end of said capillary terminating inside the casing 9 and the interior of said casing being placed in communication with static pressure by means of a connection 70 to which the static pressure portion of a Pitot tube is usually connected.

When an increase in altitude takes place, the diaphragm 60 expands until the change in altitude ceases whereupon the pressures on the inside and outside of the diaphragm equalize through the capillary 68, the rate at which the equalization takes place being an indication of the rate of change of altitude as is well known to those skilled in the art of rate-of-climb instruments.

Movement of the diaphragm 60, due to its expansion and contraction, is transmitted to a rock shaft 71 which is also journaled in the plates 12 and 13, the transmission being effected by means of a crank having one arm 72 slidably engaging a U-shaped member 73 secured to the center of the diaphragm 60 and having its other arm 74 rigidly connected to the rock shaft 71. A lever 75 is secured to the rock shaft 71 at an angle thereto and is adapted to engage a pin 76 which projects through an opening 77 in the plate 12 and which is carried by a gear sector 78. The gear sector 78 is provided with a counterweight 79 and is carried on a stub shaft 80 journaled in the fixed plates 11 and 12 and is arranged to mesh with a pinion 81 carried by a shaft 82 one end of which is journaled in the plate 12 and the other end of which extends through the hollow shafts 37 and 49. Secured to said end is a pointer 83 which cooperates with a scale 84 inscribed on the fixed plate 45. A hair spring 85 is provided to take up the back lash between the gear sector 78 and pinion 81, one end of said hair spring being connected to the shaft 82 and the other end to a pin 86 carried by the plate 12.

It will be seen from Figs. 4 and 5 that the pointers 50 and 83 are arranged about a common pivot and in planes spaced one behind the other, and that shaft 49 extends through pointer 50 while shaft 82 extends through pointer 50 and pointer 83.

Thus, it will be seen that as the diaphragm 60 expands and contracts due to a rate of change in altitude or vertical speed, its movement is transmitted to the pointer 83 by means of the rock shaft 71, lever 75, gear sector 78 and pinion 81.

Means are now provided for adjusting the dial 52 and pointer 50 of the air speed indicator so that for any desired normal cruising speed the pointer and the number representing the cruising speed on the scale 52 are brought to a horizontal position, with the pointer pointing to the left as viewed in Fig. 1, whereby said pointer moves upward when the air speed decreases below the cruising speed, as in climbing, and moves downward when the air speed increases, as in diving. In the form shown said means comprise a knob 87 accessible from the front of the instrument (Figs. 1 and 4) and secured to a shaft 88 journaled in the casing 9. Said shaft is arranged for longitudinal sliding movement therein against the compression of a coil spring 89 one end of which abuts the wall of a recess provided in the lower portion of the casing and the other end of which abuts a collar 90 secured to said shaft 88 (Fig. 4).

Figure 3:
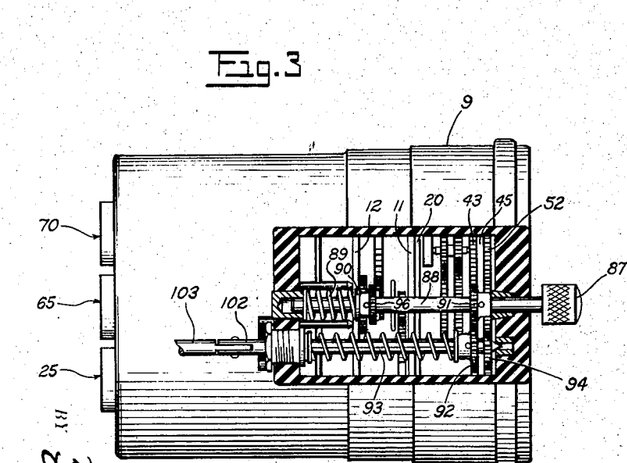
Fig. 3 is a bottom view, partly in section, taken on line 3—3 of Fig. 1, showing the manner in which the remote controller, when used, is connected to the setting mechanism of the instrument.

On the shaft 88 is provided a pinion 91 which is arranged to mesh with a pinion 92 (Fig. 3) carried on a shaft 93 which is parallel to the shaft 88 and is journaled in the lower portion of the casing 9 in the same manner as the shaft 88, said pinion 92 meshing in turn with the gear plate 43 on which is carried the bracket 42. Thus, rotation of the gear plate 43 causes the bracket 42 to revolve about the common axis of the pointers 50 and 83. As bracket 42 revolves it carries with it the gear 40 which is caused to rotate due to the planetary action between it and the gear 39 which at this time is relatively stationary. Rotation of the gear 40 in this manner produces rotation of the pointer 50 through the gears 47 and 48 thereby producing the required setting movement of the pointer. However, on the shaft 93 there is provided another pinion 94 which is in engagement with the dial ring 52 so that when the knob 87 is manipulated, the dial ring 52 is caused to rotate simultaneously and synchronously with the pointer 50 so that the number representing the desired cruising speed on the scale 51 is brought to a horizontal position together with the pointer 50. In order to accurately determine the horizontal position to which the number of the scale is to be brought there is provided a fixed reference marker 95 (Fig. 1).

It is to be understood that the gear ratios between gears 39 and 40, gears 47 and 48, gears 92 and 43, and gears 94 and 52 must be such that for one revolution of gear 43, the gear 52 (which carries the scale 51) and pointer 50 will move in unison in equal angular amounts in the same direction. For example, if the gear ratio of gear 39 to gear 40 is 3:5 and the ratio of gear 47 to gear 48 is also 3:5, then the ratio of gears 92 and 43, and that of gears 94 and 52 must be such that the final ratio between gears 43 and 52 will be 16:25 as will now be explained. Using these ratios as examples, it will be seen from Fig. 8 that if gear 43 makes one clockwise revolution about gear 39 which is stationary, gear 40 will make 3/5 of a revolution in a clockwise direction on its own axis. Then for one clockwise revolution of gear 40, gear 47 will likewise make one clockwise revolution because they rotate together on the same shaft. Gear 48 being in mesh with gear 47, the former will make 3/5 of a revolution counterclockwise for one clockwise revolution of gear 47 of for 3/5 of a clockwise revolution of gear 47, gear 48 will make 3/5 x 3/5 or 9/25 of a revolution counterclockwise. But gear 48 has an additional rotation produced by the bodily rotation of gear 47 with its axis about the gear 48, and that rotation of gear 48 is one revolution in a clockwise direction for one clockwise revolution of the large gear 43 on which the gears 40 and 47 are carried. Thus, the rotation of gear 48 is a differential rotation equal to one clockwise revolution and 9/25 of a revolution counterclockwise for one clockwise revolution of large gear 43, the net result being 1 minus 9/25 or 16/25 revolution of gear 48 clockwise for one clockwise revolution of large gear 43. Hence, gear 48 and pointer 50 move in the same direction as gear 43 and gear 52, namely, clockwise as viewed in Fig. 8 or counterclockwise when viewed from the front of the instrument, and if, as previously stated, the final ratio between gear 43 and gear 52 is 16:25, then gear 52 will move 16/25 of a revolution in a clockwise direction for one clockwise revolution of gear 43 as viewed in Fig. 8. Accordingly, when gear 43 makes one clockwise revolution, gear 48 and gear 52 both make 16/25 of a revolution in a clockwise direction as viewed in Fig. 8. Hence, pointer 50 carried by the shaft of gear 48, and scale 51 on gear 52 move in unison in equal increments in the same direction when actuated by the knob 87.

Figure 1:
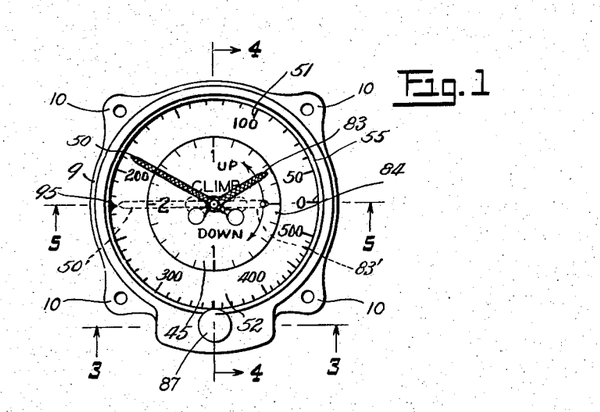
Fig. 1 is a front elevation of one form of instrument embodying the present invention.
Figure 2:
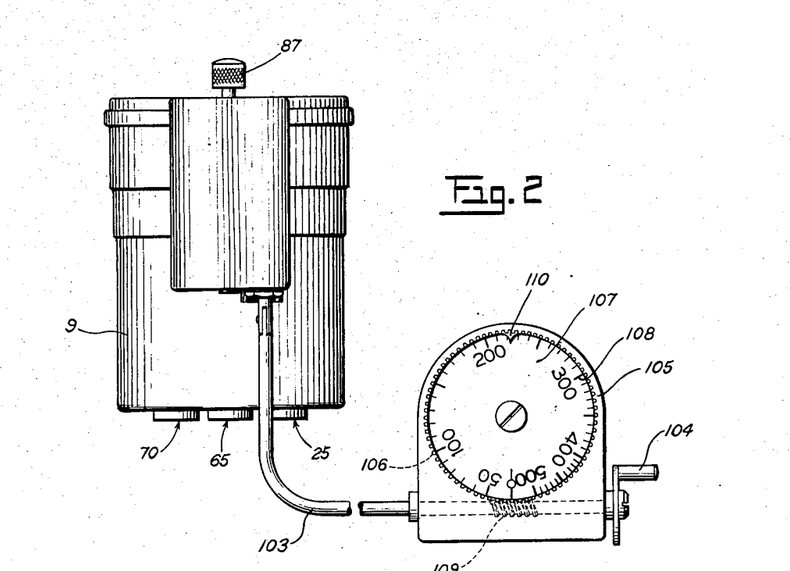
Fig. 2 is a view looking from the bottom of Fig. 1 and showing the instrument connected to a remote controller in accordance with the invention.

By way of example, in Fig. 1 the scale 51 is shown in position to indicate a cruising speed of approximately 220 miles per hour and when the pointer 50 is in alignment with the reference marker 95 said pointer will be in a horizontal position thereby indicating level flight at said cruising speed of 220 miles per hour. If the aircraft should depart from level flight as, for example, when it begins to climb, the air speed will decrease and consequently the pointer 50 will move upward from the horizontal position. On the other hand, if the craft goes into a dive the air speed will increase and consequently the pointer 50 will move downward from its horizontal position. By rotation of the dial ring 52 any number on the scale 51 may be brought into coincidence with the reference marker 95, depending upon what cruising speed is to be maintained for level flight.

Means are also provided for adjusting the pointer 83 for its zero position so that for level flight it will be in a horizontal position and pointing toward the right as viewed in Fig. 1. In the embodiment illustrated in the drawings said means comprise a pinion 96 also carried on the shaft 88 for manipulation by the knob 87. Said pinion is adapted, when the knob 87 is pushed inward of the casing, to mesh with a gear 97 carried on a shaft 98 which is journaled in a tubular member 99 secured to the supporting plate 12. On the end of said shaft 98 there is provided a cam 100 which is adapted to engage the lower portion 101 of the post 61 so that upon rotation of said cam 100 by the knob 87 through the pinion 96 and gear 97 the diaphragm 60 is adapted to be raised or lowered with respect to its support 63 and along its operating axis, thereby causing actuation of the rock shaft 71 in a manner similar to that when said rock shaft 71 is actuated by expansion and contraction of the diaphragm 60. Then through the interconnecting transmission mechanism between the rock shaft 71 and the pointer 83, the latter may be adjusted to coincide with its zero position on the scale 89, said zero position being at the right of the scale as shown in Fig. 1 and so located that when the pointer 83 coincides therewith said pointer will be in a horizontal position. Thus, it will be seen that the knob 87 and shaft 88 constitute a common means for bringing both pointers 50 and 83 into a horizontal position as illustrated at 83' and 50', and when the pointer 50 is actuated the dial ring 52 is simultaneously and synchronously rotated therewith in order to bring the number representing the desired cruising speed on the scale 51 into a horizontal position.

From the foregoing description, it will be seen that the diaphragms 21 and 60 are mounted in relatively fixed relation in the casing 9 in substantially parallel planes and positioned so as to expand in directions towards each other. Also, the diaphragms are respectively connected by means of cranks 30 and 74 to a pair of parallel rock shafts 27 and 71 positioned at right angles to the operating axes of said diaphragms, the two concentric pointers 50 and 83 being connected to the respective rock shafts through gear sectors 33 and 78 and appropriate gear trains therebetween. It will be further apparent that the rate-of-climb or vertical speed dial 45 is fixed while the horizontal speed dial 52 is rotatable and the manually operable shaft 88 is movable axially to two positions. In one position, namely, when the knob 87 is pulled outwardly of the casing, the pinion 96 is out of mesh with gear 97 while pinion 91 is in mesh with gear 92, thereby causing gears 92 and 94 to rotate gear plates 43 and 52 to cause a simultaneous and synchronous setting of the air speed pointer 50 and its dial 52 while the diaphragm 21 remains stationary with respect to the casing 9. In the second position of the shaft 88, namely, when the knob 87 is pushed inwardly of the casing, the pinion 91 is demeshed from gear 92 while pinion 96 is meshed with gear 97 to cause operation of cam 100 to raise or lower diaphragm 60 and thereby cause a setting movement of the rate-of-climb pointer 83 without rotating diaphragm 60 or dial 45. The structure thus provided is compact, simple but yet rugged and efficient.

On larger aircraft, particularly fighting craft such as bombing planes, there is usually a navigator or bomber in addition to the pilot, and the navigator or bomber and pilot are in different cockpits. It is, therefore, desirable to provide means whereby the navigator or bomber may adjust the instrument embodying the present invention from his position which is remote from the instrument panel located in the cockpit of the pilot, so that if the navigator or bomber, for purposes of a desired maneuver, wishes to signal to the pilot a new cruising speed to be maintained he may readily do so by manipulation of a control device accessible to him. For this purpose the shaft 93 (Fig. 3) is provided with an extension 102 projecting out of the lower compartment of the casing 9. To this extension is connected a flexible shaft 103, the latter being of sufficient length to reach from the instrument panel on which the instrument is mounted to the navigator or bomber's cockpit. The remote end of said flexible shaft 103 terminates in a crank handle 104 by means of which the shaft 93 at the instrument may be actuated to thereby operate the pinions 92 and 94 and gear plate 43 and dial ring 52. At the remote end, the flexible shaft 103 is made to project through a casing 105 in which is located a worm gear 106 having secured thereto a dial 107 which is provided with an air speed scale 108. The worm gear 106 is actuated by means of a worm 109 provided on the flexible shaft 103. The scale 107 is visible from the front of the casing 105 and cooperates with a fixed reference marker 110 to indicate the desired cruising speed for which the instrument at the pilot's instrument panel has been set.

There is thus provided a novel and compact aircraft speed indicator which is adapted to indicate simultaneously the longitudinal or horizontal speed of an aircraft and the vertical speed or rate of climb thereof. There are also provided novel means for adjusting the dial and pointer means of the horizontal or air speed indicating portion of the instrument as well as the pointer of the vertical speed or rate of climb indicating portion of the instrument in order that both pointers may be adjusted to be in a horizontal position and in alignment for a condition of level flight at a desired cruising speed, said pointers being concentrically mounted to form, in effect, a single hinged indicator the arms of which are concentrically pivoted at the center of the face of the instrument whereby, when the aircraft starts climbing, the hinged indicator will form an upright V and when the aircraft starts diving, the indicator will form an inverted V. Further, novel means are also provided for setting the instrument for a desired cruising speed from a remote point and for indicating the setting at the remote point.

Although only one embodiment of the invention has been illustrated and described, various changes and modifications in the form and relative arrangement of parts, which will now appear to those skilled in the art may be made without departing from the scope of the invention. For example, the novel mechanism for simultaneously and synchronously setting a dial and pointer without moving or disturbing the actuating device may be applied to an independent air speed indicator or to any indicating instrument such as an altimeter, tachometer or manifold pressure gauge. Reference is, therefore, to be had to the appended claims for a definition of the limits of the invention.

What is claimed is:

1. In an aircraft speed indicating instrument, the combination of two concentrically pivoted pointers, means responsive to the horizontal speed of an aircraft for actuating one of said pointers, means responsive to the vertical speed of said aircraft for actuating the other of said pointers, and means for setting said pointers so that they form a horizontal line across the face of the instrument for level flight at a desired horizontal cruising speed.

2. In an aircraft speed indicating instrument, the combination of two concentrically pivoted pointers, means responsive to the horizontal speed of an aircraft for actuating one of said pointers, means responsive to the vertical speed of said aircraft for actuating the other of said pointers, and means including an axially shiftable shaft for setting said pointers so that they form a horizontal line across the face of the instrument for level flight at a desired horizontal cruising speed.

3. In an indicating instrument, the combination of a pair of concentrically pivoted pointers for respectively indicating two factors contributing to the maintenance of a desired condition, means responsive to one of said factors for actuating one of said pointers, means responsive to the other factor for actuating the other of said pointers, and means for setting said pointers so that they form a straight line diametrically across the face of the instrument for any desired readings of said pointers when the desired condition is maintained.

4. In an indicating instrument, the combination of two concentrically pivoted pointers for respectively indicating two factors contributing to the maintenance of a desired condition, means responsive to one of said factors for actuating one of said pointers, means responsive to the other factor for actuating the other of said pointers, and means including an axially shiftable shaft for setting said pointers so that they form a straight line across the face of the instrument for any desired readings of said pointers when the desired condition is maintained.

5. In an aircraft indicating instrument, the combination of a hinged indicator having its hinged arms constituted by two concentrically pivoted pointers, means responsive to the horizontal speed of an aircraft for actuating one of the arms of said hinged indicator in one direction for an increase in horizontal speed, means responsive to the vertical speed of said aircraft for actuating the other arm of said hinged indicator in a direction opposite to that of the first arm for an increase in downward vertical speed, and means for setting said arms so that they form a horizontal line diametrically across the face of the instrument and point in opposite directions for level flight at a desired horizontal cruising speed and form an upright V when the aircraft is climbing and an inverted V when the aircraft is diving.

6. In an aircraft indicating instrument, the combination of a hinged indicator having its hinged arms constituted by two concentrically pivoted pointers, means responsive to the horizontal speed of an aircraft for actuating one of the arms of said hinged indicator in one direction for an increase in horizontal speed, means responsive to the vertical speed of said aircraft for actuating the other arm of said hinged indicator in a direction opposite to that of the first arm for an increase in downward vertical speed, and means including an axially shiftable shaft for setting said arms so that they form a horizontal line across the face of the instrument and point in opposite directions for level flight at a desired horizontal cruising speed and form an upright V when the aircraft is climbing and an inverted V when the aircraft is diving.

7. In an indicating instrument, the combination of two concentrically pivoted pointers for respectively indicating two factors contributing to the maintenance of a desired condition, means responsive to one of said factors for actuating one of said pointers, means responsive to the other factor for actuating the other of said pointers, and means for setting said pointers so that they form a straight line across the face of the instrument when the desired condition is maintained, said last-mentioned means including a manually operable shaft axially movable to two positions whereby in one position of said shaft one of said pointers is adjusted and in the other position of said shaft the other pointer is adjusted.

8. In an indicating instrument, the combination of two concentrically pivoted pointers for respectively indicating two factors contributing to the maintenance of a desired condition, means responsive to one of said factors for actuating one of said pointers, means responsive to the other factor for actuating the other of said pointers, means for setting said pointers so that they form a straight line diametrically across the face of the instrument when the desired condition is maintained, and means interconnected with said last-mentioned means for setting one of said pointers from a remote point.

9. In an indicating instrument, the combination of two concentrically pivoted pointers for respectively indicating two factors contributing to the maintenance of a desired condition, means responsive to one of said factors for actuating one of said pointers, means responsive to the other factor for actuating the other of said pointers, means for setting said pointers so that they form a straight line diametrically across the face of the instrument when the desired condition is maintained, means interconnected with said last-mentioned means for setting one of said pointers from a remote point, and means at said remote point for indicating the condition for which said last-mentioned pointer has been set.

10. In an aircraft speed indicating instrument, the combination of two concentrically pivoted pointers, means responsive to the horizontal speed of an aircraft for actuating one of said pointers, means responsive to the vertical speed of said aircraft for actuating the other of said pointers, means for setting said pointers so that they form a horizontal line across the face of the instrument for level flight at a desired horizontal cruising speed, and means interconnected with said last-mentioned means for setting said horizontal speed pointer from a remote point.

11. In an aircraft speed indicating instrument, the combination of two concentrically pivoted pointers, means responsive to the horizontal speed of an aircraft for actuating one of said pointers, means responsive to the vertical speed of said aircraft for actuating the other of said pointers, means for setting said pointers so that they form a horizontal line across the face of the instrument for level flight at a desired horizontal cruising speed, means interconnected with said last-mentioned means for setting said horizontal speed pointer from a remote point, and means at said remote point for indicating the cruising speed for which said horizontal speed pointer has been set.

12. In an aircraft indicating instrument, the combination of a casing, a pair of pressure-responsive diaphragms mounted in said casing in substantially parallel planes and positioned so as to expand in directions towards each other, one of said diaphragms being responsive to rate of climb of an aircraft and the other being responsive to change in horizontal air speed of said aircraft, a pair of parallel rock shafts respectively connected to said diaphragms and positioned at right angles to the operating axes of said diaphragms, a pair of concentrically pivoted pointers, means respectively connecting said pointers to said rock shafts for actuation thereby, a stationary dial for the rate-of-climb pointer, a rotatable dial for the air speed pointer and arranged concentrically with said stationary dial, means for causing a setting movement of the rate-of-climb pointer, means for causing a separate setting movement of the air speed pointer, means for causing a setting movement of the rotatable dial simultaneously and synchronously with the setting movement of the air speed pointer, and manually operable means for alternately actuating the setting means of the rate-of-climb pointer and the setting means of the air speed pointer and rotatable dial.

13. In an aircraft indicating instrument, the combination of a casing, a pair of pressure-responsive diaphragms mounted in said casing in substantially parallel planes and positioned so as to expand in directions towards each other, one of said diaphragms being responsive to rate of climb of an aircraft and the other being responsive to change in horizontal air speed of said aircraft, a pair of parallel rock shafts respectively connected to said diaphragms and positioned at right angles to the operating axes of said diaphragms, a pair of concentrically pivoted pointers, means respectively connecting said pointers to said rock shafts for actuation thereby, a stationary dial for the rate-of-climb pointer, a rotatable dial for the air speed pointer and arranged concentrically with said stationary dial, means for causing a setting movement of the rate-of-climb pointer, means for causing a separate setting movement of the air speed pointer, means for causing a setting movement of the rotatable dial simultaneously and synchronously with the setting movement of the air speed pointer, and manually operable means including an axially movable shaft for alternately actuating the setting means of the rate-of-climb pointer and the setting means of the air speed pointer and rotatable dial.

14. In an aircraft indicating instrument, the combination of a casing, a pair of pressure-responsive diaphragms mounted in said casing in normally fixed relation thereto, one of said diaphragms being responsive to rate of climb of an aircraft and the other being responsive to change in horizontal air speed of said aircraft, a pair of concentrically pivoted pointers, means respectively connecting said pointers to said diaphragms for actuation thereby, a relatively fixed dial for the rate-of-climb indicating pointer, a relatively rotatable dial for said air speed pointer and mounted in concentric relation with said fixed dial, means for causing a setting movement of said rate-of-climb pointer, and means for causing a setting movement of said air speed pointer while its actuating diaphragm remains relatively fixed and for causing a simultaneous and synchronous setting movement of said rotatable dial.

15. In an indicating instrument, the combination of a casing, a pair of actuating devices mounted in said casing in normally fixed relation thereto, one of said devices being responsive to one factor and the other being responsive to a related factor contributing to the maintenance of a predetermined condition, a pair of concentric dials, a pair of concentrically pivoted pointers cooperating with said dials to respectively indicate the two related factors, transmission mechanisms respectively connecting said pointers to said devices for actuation by the latter, one of said dials being fixedly mounted in said casing and the other being rotatably mounted therein, means for causing a separate setting movement of the pointer which cooperates with the fixed dial, and means for causing a simultaneous and synchronous setting movement of the other pointer and the rotatable dial.

16. In an indicating instrument, the combination of a casing, a pair of actuating devices mounted in said casing in normally fixed relation thereto, one of said devices being responsive to one factor and the other being responsive to a related factor contributing to the maintenance of a predetermined condition, a pair of concentric dials, a pair of concentrically pivoted pointers cooperating with said dials to respectively indicate the two related factors, transmission mechanisms respectively connecting said pointers to said devices for actuation by the latter, one of said dials being fixedly mounted in said casing and the other being rotatably mounted therein, means for causing a separate setting movement of the pointer which cooperates with the fixed dial, means for causing a simultaneous setting movement of the other pointer and the rotatable dial, and common means for alternately and at will actuating said two last-mentioned means from the exterior of the casing.

17. In an indicating instrument, the combination of a casing, a pair of actuating devices mounted in said casing in normally fixed relation thereto, one of said devices being responsive to one factor and the other being responsive to a related factor contributing to the maintenance of a predetermined condition, a pair of concentric dials, a pair of concentrically pivoted pointers cooperating with said dials to respectively indicate the two related factors, transmission mechanisms respectively connecting said pointers to said devices for actuation by the latter, one of said dials being fixedly mounted in said casing and the other being rotatably mounted therein, means for causing a separate setting movement of the pointer which cooperates with the fixed dial, means for causing a simultaneous and synchronous setting movement of the other pointer and the rotatable dial, and common means for alternately and at will actuating said two last-mentioned means from the exterior of the casing, said common means including a manually operable and axially movable rotatable shaft.

18. The combination in an aircraft indicating instrument including a casing adapted for mounting on an instrument board of an aircraft, an actutating device, a pointer, transmission means connecting said pointer to said device for actuation by the latter, and a dial cooperating with said pointer, of means fixedly mounting said actuating device in said casing, means rotatably mounting said dial in said casing, and gear means interconnecting said dial and pointer for causing simultaneous and synchronous setting rotation thereof in unison relative to said casing and in equal amounts while said actuating device remains stationary in said casing, whereby said pointer and dial may be rotated so as to bring the pointer into the same predetermined position with respect to said casing for any desired reading of said pointer on said dial and representing a predetermined condition of flight of the aircraft on which the instrument may be mounted, and movement of said pointer thereafter by said actuating device in either direction from said position indicates a departure from said predetermined condition of flight.

19. The combination in an aircraft indicating instrument including a casing adapted for mounting on an instrument board of an aircraft, an actuating device, a pointer, transmssion means connecting said pointer to said actuating device for actuation by the latter, and a dial cooperating with said pointer, of means fixedly mounting said actuating device in said casing, means rotatably mounting said dial in said casing, and means including a planetary gear train interconnecting said dial and pointer for causing simultaneous and synchronous setting rotation thereof in unison relative to said casing and in equal amounts in the same direction while said actuating device remains stationary in said casing and without interfering with the actuation of said pointer by said actuating device, whereby said pointer and dial may be rotated so as to bring the pointer into the same predetermined position with respect to said casing for any desired reading of said pointer on said dial and representing a predetermined condition of flight of the aircraft on which the instrument may be mounted, and movement of said pointer thereafter by said actuating device in either direction from said position indicates a departure from said predetermined condition of flight.

20. The combination in an aircraft indicating instrument including a casing adapted for mounting on an instrument board of an aircraft, an actuating device, a pointer, transmission means connecting said pointer to said actuating device for actuation by the latter, and a dial cooperating with said pointer, of means fixedly mounting said actuating device in said casing, means rotatably mounting said dial in said casing, gear means interconnecting said dial and pointer for causing simultaneous and synchronous setting rotation thereof in unison relative to said casing and in equal amounts in the same direction while said actuating device remains stationary in said casing and without interfering with the actuation of said pointer by said actuating device, whereby said pointer and dial may be rotated so as to bring the pointer into the same predetermined position with respect to said casing for any desired reading of said pointer on said dial and representing a predetermined condition of flight to be maintained at said reading by the aircraft on which the instrument may be mounted, and movement of said pointer thereafter by said actuating device in either direction from said position indicates a departure from said predetermined condition of flight, and means interconnected with said last-mentioned means for setting said dial and pointer from a remote point.

21. The combination in an aircraft indicating instrument including a casing adapted for mounting on an aircraft, an actuating device, a pointer, means connecting said pointer to said actuating device for actuation by the latter, and a dial cooperating with said pointer, of means fixedly mounting said actuating device in said casing, means rotatably mounting said dial in said casing, gear means interconnecting said dial and pointer for simultaneous and synchronous setting rotation thereof in unison relative to said casing and in equal amounts while said actuating device remains stationary in said casing, and means for actuating said last-mentioned means, whereby said dial and pointer may be settably rotated so as to bring the pointer into the same predetermined position with respect to said casing for any desired reading of said pointer on said dial and representing a predetermined condition of flight of the aircraft on which the instrument may be mounted, and movement of said pointer thereafter by said actuating device in either direction from said position indicates a departure from said predetermined condition of flight.

22. The combination in an aircraft indicating instrument including a casing adapted for mounting on an instrument board of an aircraft, a pressure responsive device, a pointer, transmission means connecting said pointer to said pressure responsive device for actuation by the latter, and a dial cooperating with said pointer, of means fixedly mounting said pressure responsive device in said casing, means rotatably mounting said dial in said casing, and gear means interconnecting said dial and pointer for causing simultaneous and synchronous setting rotation thereof in unison relative to said casing and in equal amounts while said pressure responsive device remains stationary in said casing and without interfering with the actuation of said pointer by said pressure responsive device, whereby said dial and pointer may be settably rotated so as to bring the pointer into the same predetermined position with respect to the casing for any desired reading of said pointer on said dial and representing a predetermined condition of flight of the aircraft on which the instrument may be mounted, and movement of said pointer thereafter by said pressure responsive device in either direction from said position indicates a departure from said predetermined condition of flight.

23. The combination in an aircraft airspeed indicator including a casing adapted for mounting on an instrument board of an aircraft, a pressure responsive device having means for connecting it to a Pitot tube carried by the aircraft and disposed to velocity pressures produced by the flight of the aircraft whereby said device expands and contracts in accordance with changes in airspeed of said aircraft, a pointer, transmission means connecting said pointer to said pressure responsive device for actuation by the latter in accordance with changes in airspeed, and a dial having an airspeed scale cooperating with said pointer for indicating airspeed, of means fixedly mounting said pressure responsive device in said casing, means rotatably mounting said dial in said casing, and gear means interconnecting said dial and pointer for causing simultaneous and synchronous setting rotation thereof in unison relative to said casing and in equal amounts in the same direction while said pressure responsive device remains stationary in said casing, whereby said dial and pointer may be rotated into a position in which the pointer is horizontal for any desired airspeed indicated by said pointer on said dial and represents level flight of the aircraft on which the indicator may be mounted, and movement of said pointer thereafter by said pressure responsive device upward or downward represents a departure upward or downward, respectively, from level flight.

24. In an indicating instrument including a casing, an actuating device in said casing, a pointer, means connecting said pointer to said actuating device for actuation by the latter, and a dial cooperating with said pointer, the combination of means fixedly mounting said actuating device in said casing, means rotatably mounting said dial in said casing, and means including a gear train interconnecting said dial and pointer for causing simultaneous and synchronous setting rotation thereof in unison relative to said casing and in equal amounts in the same direction, whereby said dial and pointer may be settably rotated so as to bring the pointer into the same predetermined position with respect to the casing for any desired reading of said pointer on said dial.

25. In an indicating instrument including a casing, an actuating device in said casing, a pointer, means connecting said pointer to said actuating device for actuation by the latter, and a dial cooperating with said pointer, of means fixedly mounting said actuating device in said casing, means rotatably mounting said dial in said casing, and means including a planetary gear train interconnecting said dial and pointer for causing simultaneous and synchronous setting rotation thereof in unison relative to said casing, and in equal amounts in the same direction and without interfering with the actuation of said pointer by said actuating device, whereby said dial and pointer may be rotated so as to bring the pointer into the same predetermined position with respect to the casing for any desired reading of said pointer on said dial.

26. An indicating unit having parts comprising a plurality of flight responsive instrumentalities, a pointer for each of said instrumentalities arranged about a common pivot and in planes spaced one behind the other, common shaft means extending through said pointers, means connecting each of said instrumentalities with its pointer whereby said pointers may be rotated about the axis of said shaft means, a dial for each of said pointers, means for manually adjusting said pointers and dials to cause the pointers to move into alignment without disturbing the instrument readings in order to indicate desired conditions during flight, and means for supporting said parts in operative relation.

27. An indicating unit having parts comprising a plurality of flight indicating instruments, a pointer for each of said instruments arranged in planes spaced one behind the other, common shaft means extending through said pointers, means connecting each of said instruments with its pointer whereby said pointers may be rotated about the axis of said shaft means by the instrument connected thereto, means for manually adjusting said instruments and pointers whereby said pointers may be adjusted to cause the same to move into alignment in order to indicate desired conditions during flight, and means for supporting said parts in operative relation.

CARL J. CRANE.
FRANCIS G. NESBITT.